… …

United States Patent Office 2,905,721
Patented Sept. 22, 1959

2,905,721

SURFACE-ACTIVE ACETALS AND FORMALS AND SULFUR ANALOGS THEREOF

Peter L. de Benneville and Homer J. Sims, Philadelphia, Pa., assignors to Rohm & Haas Company, Philadelphia, Pa., a corporation of Delaware No Drawing. Application September 24, 1957
Serial No. 685,795

12 Claims. (Cl. 260—609)

The present invention concerns specific symmetrical surface-active acetals and formals. It is further concerned with specific surface-active acetals and formals that are stable under alkaline or neutral conditions but which may be altered by acidic conditions. This alteration may take the form of changing an oil-soluble, surface-active compound to one of no surface activity or a water-soluble, surface-active compound to one of no surface activity. This invention also concerns a method for the preparation of the specific surface-active acetals and formals.

A wide variety of non-ionic, surface-active agents is known in the art and usually these are stable in acid, basic and neutral media. In many applications it is necessary or at least highly desirable to remove or change the surface activity of an agent at some critical point in the operation. For example, if an ordinary non-ionic, surface-active agent is used to remove oils and waxes from raw wool by emulsification, there is obtained an emulsion in water which is not easily broken, either for the recovery of the oils and waxes or purposes of disposal. Also, the effluent from commercial laundries using non-ionic detergents remains highly surface active causing many troublesome problems of foaming and disposal. Further, when non-ionic, surface-active agents are used for the recovery of petroleum, there is obtained an emulsion which is not easily broken without the use of certain complex and expensive demulsifying agents. The present compounds can be used in all of the above situations by employing a step in which the objectionable emulsions are treated with dilute acids which, since there is an alteration in the surface-active properties of the present compounds, permits the ready and effective conclusion of the operations described heretofore. The subject compounds may also be used in the preparation of emulsion polymers which can well be coagulated, if desired, in fiber form by treatment with dilute acids. These compounds are easily prepared from only two readily available starting materials, an alkylphenoxymethyl chloromethyl ether and a polyethylene glycol. Aqueous 0.1% solutions of them display low surface tensions and good surface-active properties, along with unusually low foaming properties.

Symmetrical acid-sensitive, non-ionic, surface-active acetals and formals of this invention may be represented by the formula

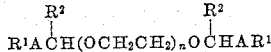

in which $R^1$ represents an alkyl group of eight to eighteen carbon atoms, $R^2$ is a hydrogen atom or a methyl group, A is a chalcogen having an atomic weight of sixteen to thirty-two, i.e., oxygen or sulfur, and $n$ is an integer of about six to fifty.

$R^1$ may typically be octyl, nonyl, decyl, dodecyl, tetradecyl, octadecyl, or the like in any of the known spatial configurations, such as normal, iso, or tertiary.

$R^2$ has been stated as representing a hydrogen atom or a methyl group. When $R^2$ represents a hydrogen atom, a formal structure is obtained and, when $R^2$ represents a methyl group, an acetal structure is obtained.

The integer $n$ varies from six to about fifty. When $n$ ranges from about six to twelve, the product is substantially oil soluble and, when $n$ ranges from thirteen to about fifty, the product is substantially water soluble.

The present compounds are preferably prepared by reacting a compound having the formula

with one having the formula

in which X is chlorine or bromine. The reaction is conducted in the presence of a strongly basic inorganic neutralizing agent. Among the basic agents that may be employed are the alkali metals, such as sodium and potassium, the alkali metal hydroxides, such as sodium hydroxide, potassium hydroxide, or lithium hydroxide, alkaline earth metal hydroxides, such as barium hydroxide, calcium hydroxide, and strontium hydroxide, alkali metal carbonates, such as sodium carbonate, potassium carbonate, and the like. The basic agent should be present in an amount somewhat greater than an equivalent amount of the reactants in order to assure the complete neutralization of the hydrochloric or hydrobromic acid formed in the reaction. The present reaction occurs between substantially two molecular equivalents of the halogenated reactant with one of the glycol reactants. It is possible to react one molecular equivalent of the glycol with a molecular equivalent of each of two different halogenated reactants, if desired, in order to obtain different $R^1$ and $R^2$ groups on the hydrophobe ends of the molecule, but such usually leads to a mixture of products. As an alternative method for preparing members having acetal structures, there may be used the reaction between a specific vinyl ether and a defined glycol in the presence of an acidic catalyst. In this modification the reactants may be represented by the formulas

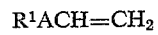

and

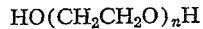

and the acidic catalysts may be typically concentrated hydrochloric acid, concentrated sulfuric acid, syrupy phosphoric acid, boron trifluoride, or boron trifluoride coordinated complexes. This alternative method consists of reacting substantially two molecular equivalents of a single vinyl ether or one molecular equivalent of each of two different vinyl ethers with one molecular equivalent of the glycol.

The compounds of this invention are prepared by conducting the reaction in the temperature range of about 40° to 100° C., preferably 50° to 70° C. When a halogenated reactant is employed the reaction is exothermic in nature. It is preferable to add to the reaction system the alcohol reactant and the acidic catalyst or basic agent, as the case may be, and then introduce the other reactant, the vinyl ether or the halogenated compound, as the case may be. Such a procedure assures a maximization of yields and minimization of undesired side reactions. Reaction time is not critical but generally will vary from about thirty minutes to ten hours or more depending largely on the individual reactants employed. A solvent is not required in this reaction but sometimes, in order to aid in the separation of the inorganic salt by-product formed when the halogenated reactant is employed, it may be advantageous to employ a volatile inert organic solvent such as benzene, toluene, or the like.

Typical reactants that may be employed include:

$C_8H_{17}OCH_2Cl$ $C_9H_{19}OCH_2Br$ $C_{10}H_{21}O\overset{\underset{|}{CH_3}}{C}HCl$ $C_{12}H_{25}OCH_2Cl$ $C_{12}H_{25}SCH_2Cl$ $C_{14}H_{29}O\overset{\underset{|}{CH_3}}{C}HBr$ $C_{16}H_{33}OCH_2Cl$ $C_{18}H_{37}O\overset{\underset{|}{CH_3}}{C}HCl$ $C_{18}H_{37}SCH_2Br$ $C_8H_{17}OCH=CH_2$ $C_{10}H_{21}OCH=CH_2$ $C_{12}H_{25}SCH=CH_2$ $C_{12}H_{25}OCH=CH_2$ $C_{14}H_{29}OCH=CH_2$ $C_{18}H_{37}SCH=CH_2$ $C_{18}H_{37}OCH=CH_2$ $HO(CH_2CH_2O)_6H$ $HO(CH_2CH_2O)_9H$ $HO(CH_2CH_2O)_{15}H$ $HO(CH_2CH_2O)_{20}H$ $HO(CH_2CH_2O)_{25}H$ $HO(CH_2CH_2O)_{30}H$ $HO(CH_2CH_2O)_{40}H$ $HO(CH_2CH_2O)_{45}H$ $HO(CH_2CH_2O)_{48}H$ and $HO(CH_2CH_2O)_{50}H$ The reactants of this invention are known compounds or readily prepared by known methods. In the preparation of the glycol reactants having six to fifty ethoxy units there is frequently obtained a mixture of compounds having different numbers of ethoxy units. This is known in the art and is no deterrent to the present reaction since satisfactory and useful compounds are formed from the mixtures of compounds in the same way as the individual compounds. It is to be understood, therefore, that the integer $n$ stands for either the number of ethoxy units in a single compound or an average value in a mixture of compounds.

At the conclusion of the reaction, if a halogenated reactant is used, the halide salt formed as a reaction by-product is removed by filtration. The product is obtained as the filtrate. If a solvent has been employed, as indicated previously, it may be removed by stripping in a conventional manner. Even if a solvent has not been employed during the course of the reaction, the use of one is often advantageous in the isolation of the product in order to facilitate the removal of the inorganic halide salt formed. When a vinyl ether reactant is used the reaction medium is neutralized at the conclusion of the reaction by the addition of sodium hydroxide or the like. The resulting neutralization product may be removed by filtration, if desired, but since the amount of such is relatively small and does not interfere with the desired product no further operations of isolation are usually conducted.

The products of this invention, having the utilities previously stated, possess the hydrophobic-hydrophilic balance required for a substance to exhibit surface activity. As has been presented previously it is frequently desirable to employ a surface-active material at one stage of a process and not have such material interfere at a later stage of the process as has been outlined heretofore. The present compounds may be used as valuable surface-active agents at one stage of a process and then chemically altered to lose surface-activity at a later stage of the process. The present compounds are quite stable in alkaline or neutral media, but may be chemically altered in an acidic media particularly at temperatures approaching about 100° C. Hydrochloric acid or the like is particularly convenient and effective for use in this respect and the change is effected usually in a matter of minutes, such as five or ten, depending largely on the temperatures and compounds involved. The present compound is split into five fragments, two of which are aldehyde usually the same, two are oily, water-insoluble compounds usually the same, and the fifth is a glycol. None of these fragments is surface active. Therefore, a compound is available that is surface active during its period of use when surface activity is demanded and which can be readily altered to yield compounds that are no longer surface active and that can be readily disposed of when such conditions are required.

The compounds of this invention, as well as the methods for their preparation, may be more fully understood from the following examples which are offered by way of illustration and not by way of limitation. Parts by weight are used throughout.

*Example 1*

A mixture is made of 14.1 parts of $H(OCH_2CH_2)_6OH$ and 4 parts of powdered potassium hydroxide. The mixture is heated to 60° C. and to it is added over a forty minute period 23 parts of n-dodecylchloromethyl ether. Stirring and heating are continued for a period of one hour. The reaction mixture is filtered while hot to obtain the product as an oil-soluble liquid which promotes the formation of water and oil emulsions. The product corresponds to $n-C_{12}H_{25}OCH_2O(CH_2CH_2O)_6CH_2O-n-C_{12}H_{25}$ In the same way there are prepared $C_8H_{17}OCH_2O(CH_2CH_2O)_{20}CH_2OC_8H_{17}$ and $C_{18}H_{37}O\overset{\underset{|}{CH_3}}{C}H(CH_3)O(CH_2CH_2O)_{50}\overset{\underset{|}{CH_3}}{C}HOC_{18}H_{37}$

*Example 2*

To a reaction vessel are added 77 parts of $H(OCH_2CH_2)_{35}OH$ and 3 parts of powdered sodium hydroxide. The mixture is heated to 60° C. and to it is added with stirring over a period of one hour 28 parts of t-dodecylchloromethyl sulfide. The mixture is heated at 60° C. for one hour, diluted with 200 parts of toluene, cooled and filtered. Toluene is removed by stripping in vacuo and there is thus isolated a product corresponding to $t-C_{12}H_{25}SCH_2(OCH_2CH_2)_{35}OCH_2S-t-C_{12}H_{25}$ This product is a soft wax which is soluble in water and surface active.

In a similar manner there are prepared $C_8H_{17}SCH_2O(CH_2CH_2O)_{50}CH_2SC_8H_{17}$ and $C_{18}H_{37}SCH_2O(CH_2CH_2O)_{25}CH_2SC_{18}H_{37}$

*Example 3*

A polyethylene glycol of average structure $H(OC_2H_4)_{10}OH$ taken in 46 parts is acidified to pH=2 by concentrated hydrochloric acid. The mixture is heated on the steam bath and to it is added dropwise 42.5 parts of lauryl vinyl ether. The pH is checked at intervals and more acid is added when necessary to maintain the acidity at pH 2. At the end of this time the mixture is made basic with about five drops of aqueous 50% sodium hydroxide solution. The product which is obtained is soluble in oils and confers upon these oils emulsifiability with water. The product corresponds to the formula $$C_{12}H_{25}OCH(CH_3)O(CH_2CH_2O)_{10}CH(CH_3)OC_{12}H_{25}$$

In a similar manner there are prepared $$C_8H_{17}OCH(CH_3)O(CH_2CH_2O)_6CH(CH_3)OC_8H_{17}$$

and $$C_{18}H_{37}OCH(CH_3)O(CH_2CH_2O)_{20}CH(CH_3)OC_{18}H_{37}$$

We claim:

1. A composition of matter having the formula $$R^1A\overset{R^2}{\underset{|}{C}}H(OCH_2CH_2)_n O\overset{R^2}{\underset{|}{C}}HAR^1$$

in which $R^1$ represents an alkyl group of 8 to 18 carbon atoms, $R^2$ is a member of the group consisting of a hydrogen atom and a methyl group, A is a chalcogen having an atomic weight of 16 to 32, and $n$ is an integer of about 6 to 50.

2. A composition of matter having the formula $$R^1O\overset{CH_3}{\underset{|}{C}}H(OCH_2CH_2)_n O\overset{CH_3}{\underset{|}{C}}HOR^1$$

in which $R^1$ is an alkyl group of 8 to 18 carbon atoms and $n$ is an integer of about 6 to 50.

3. A composition of matter having the formula $$R^1OCH_2(OCH_2CH_2)_n OCH_2OR^1$$

in which $R^1$ is an alkyl group of 8 to 18 carbon atoms and $n$ is an integer of about 6 to 50.

4. A composition of matter having the formula $$R^1S\overset{CH_3}{\underset{|}{C}}H(OCH_2CH_2)_n O\overset{CH_3}{\underset{|}{C}}HSR^1$$

in which $R^1$ is an alkyl group of 8 to 18 carbon atoms and $n$ is an integer of about 6 to 50.

5. A composition of matter having the formula $$R^1SCH_2(OCH_2CH_2)_n OCH_2SR^1$$

in which $R^1$ is an alkyl group of 8 to 18 carbon atoms and $n$ is an integer of about 6 to 50.

6. A composition of matter having the formula $$n{-}C_{12}H_{25}OCH_2O(CH_2CH_2O)_6CH_2O{-}n{-}C_{12}H_{25}$$

7. A composition of matter having the formula $$C_8H_{17}OCH_2O(CH_2CH_2O)_{20}CH_2OC_8H_{17}$$

8. A composition of matter having the formula $$C_{18}H_{37}O\overset{CH_3}{\underset{|}{C}}H(CH_3)O(CH_2CH_2O)_{50}\overset{CH_3}{\underset{|}{C}}HOC_{18}H_{37}$$

9. A composition of matter having the formula $$t{-}C_{12}H_{25}SCH_2(OCH_2CH_2)_{35}OCH_2S{-}t{-}C_{12}H_{25}$$

10. A composition of matter having the formula $$C_{12}H_{25}OCH(CH_3)O(CH_2CH_2O)_{10}CH(CH_3)OC_{12}H_{25}$$

11. A method for preparing a compound having the formula $$R^1A\overset{R^2}{\underset{|}{C}}H(OCH_2CH_2)_n O\overset{R^2}{\underset{|}{C}}HAR^1$$

in which $R^1$ represents an alkyl group of 8 to 18 carbon atoms, $R^2$ is a member of the group consisting of a hydrogen atom and a methyl group, A is a chalcogen having an atomic weight of 16 to 32, and $n$ is an integer of about 6 to 50, which comprises bringing together in a reacting temperature in the range of about 40° to 100° C. in the presence of a strongly basic inorganic neutralizing agent a compound having the formula $$R^1A\overset{R^2}{\underset{|}{C}}HX$$

with a compound having the formula $$HO(CH_2CH_2O)_n H$$

in which X is a halogen having an atomic weight of about 35.5 to 80.

12. A method according to claim 11 in which the reacting temperature is about 50° to 70° C.

References Cited in the file of this patent

UNITED STATES PATENTS 2,205,021    Schuette et al. _____ June 18, 1940

OTHER REFERENCES

Cocker et al.: J. Chem. Soc. (London), 1930, 440–455.